July 25, 1944.          H. L. GENTIL          2,354,253

REDUCTION OF MAGNESIUM

Filed March 25, 1940          2 Sheets-Sheet 1

July 25, 1944.  H. L. GENTIL  2,354,253
REDUCTION OF MAGNESIUM
Filed March 25, 1940  2 Sheets-Sheet 2
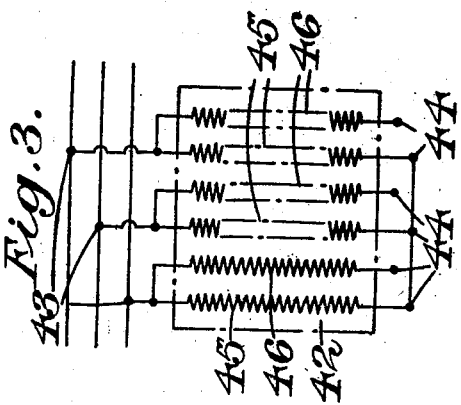
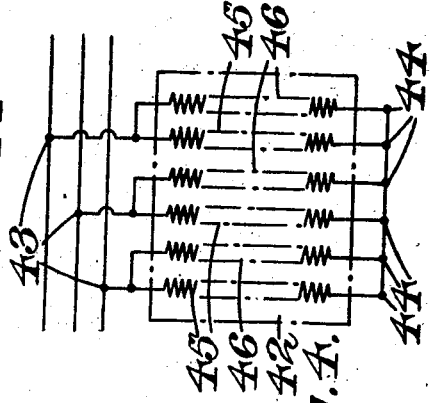
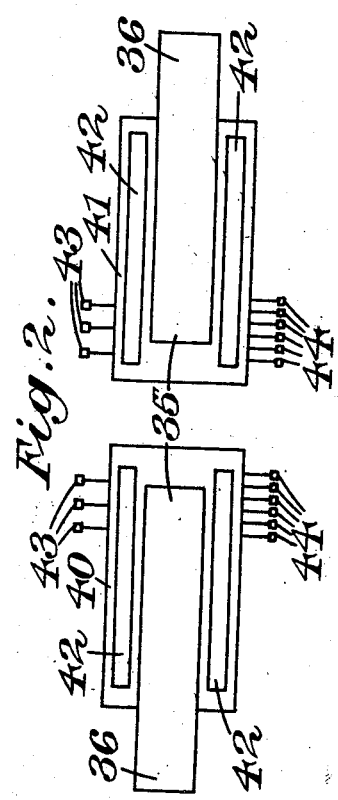

Patented July 25, 1944

2,354,253

UNITED STATES PATENT OFFICE 2,354,253

REDUCTION OF MAGNESIUM

Henri Louis Gentil, Paris, France, assignor to Alloy Processes Limited, London, England, a British company Application March 25, 1940, Serial No. 325,842
In Great Britain April 1, 1939

2 Claims. (Cl. 75—67)

This invention comprises improvements in or relating to the reduction of magnesium.

It is an object of the invention to provide a process for the direct reduction of magnesium from its oxygen compounds. It is known that magnesium can be produced in metallic form by the thermal reduction of calcined magnesite or dolomite. This process involves the steps of first calcining the ore, thereafter admixing it with a reducing agent and then subjecting it to the reducing operation. The process is wasteful of heat and unsatisfactory in various respects, particularly as the material to be reduced is a very bad conductor of heat and there is a tendency for parts of the charge to reach reduction temperature so much in advance of other parts that the reaction proceeds irregularly and the process is inefficient. It is an object of the present invention to provide a process in which heat is conserved, a uniform reaction takes place, a satisfactory recovery of the metal is obtained and the period of operation and number of operations is reduced.

It has been found that although the mixture is a very bad conductor of heat, when a metallic reducing agent is employed and it is preheated sufficiently in a preliminary heating operation a rapid and thorough reduction takes place when the temperature is thereafter raised to the reaction temperature.

The present invention comprises a process of reduction of magnesium comprising in combination the steps of mixing magnesium-bearing mineral and a metallic reducing agent preferably of the class which comprises the light metals, aluminium, calcium and alloys of these materials, heating the mixture to a temperature below the reduction temperature and, after the material has been heated through, raising the temperature to that at which reduction takes place.

While calcined or oxide mineral can be treated in the manner described it is a feature of the invention that crude material such as magnesite or dolomite may be introduced into the heating zone in a crushed condition and in admixture with the reducing agent without any preliminary calcining operation.

It is a feature of the invention that the reduction process should be carried out under a high vacuum. The degree of vacuum desirable may be that corresponding to an absolute pressure of 0.5 to 10 mm. of mercury. The preliminary heating, which in the case of the treatment of crude magnesite or dolomite is also a calcining action, may be carried out at a temperature in the neighbourhood of 600°–700° C. When reducing agents such as hereinabove mentioned are employed the reduction will take place at a higher temperature of the order of 1250° C.

The following is a description, by way of example, of various methods by which the invention can be carried into effect, reference being made to the accompanying drawings in which:

Figure 1 is a diagram of a gas or oil-heated reduction plant;

Figure 2 is a diagram of an electrically heated reduction plant; and

Figures 3 and 4 are connection diagrams.

Referring to Figure 1 a number of furnace chambers 11, 12, 13, 14 and 15 are provided which are indicated in the drawings merely by rectangles and which will, of course, be suitably constructed, lined with a refractory material and provided with the necessary appurtenances of a furnace of this kind. A hot air flue 16 is provided which is connected to each of the furnaces by a branch 17 controlled by a valve 18. The valve 18 admits air to a burner 19 which is supplied with fuel through a pipe 20 from a source not shown. There is an outlet 23 which is connected by a valve 24 to an interconnecting flue 25.

The hot air flue 16 and the interconnecting flue 25 for burning gases are in the form of ring mains provided respectively with valves 29 and 30 which are located between the connections of the furnaces to them. The flue 16 is also connected to an outlet chimney 26. By the flue 25 hot burnt gases from any one furnace can be led to any adjacent furnace so as to preheat the same and hot air which has been heated in any one furnace chamber can be conducted by means of the flue 16 to any adjacent furnace chamber to supply the burner thereof.

Air may be blown in by a fan 31 through a cold air trunk 32 which delivers it through valves 33 in branches 34 to the burners 19 which can also be used as cold air inlets if the fuel is cut off from the pipes 20.

The material to be treated is placed in stout metallic, refractory-lined tubes 35 which are rendered vacuum-tight. These tubes are connected to condensing chambers 36 and appropriate connections not shown in the drawings are made to means for maintaining a vacuum therein.

The process is conducted in the following manner:

One chamber, say 12, which is at full heat is carried to the reaction temperature by burning gas or oil in the burner 19 with the aid of air supplied to the branch 17 from the flue 16. This temperature will be approximately 1250° C. Hot burnt gases escaping from the chamber 12 are led to the flue 25 through the valve 24 and thence along the flue and back through the valve 24 of the next chamber 13, the appropriate valve 30 being open for the purpose and the other valves in the flue closed. In the chamber 13 the hot gases from the chamber 12 serve to preheat the mixture of ore and reducing agent in the receptacles 35 and to raise the mixture to a temperature of between 600–700° C. Meanwhile the reducing action which is occurring in the receptacles 35 of the chamber 12 serves not only to reduce but also to distil the magnesium and it is condensed in the condensers 36.

When one judges that the reaction is terminated in the chamber 12 the chamber 13 is put under full heat by admitting hot air thereto through the appropriate branch of the flue 16 while the hot air and fuel are cut off from the chamber 12, which is allowed to cool. In order to hasten the cooling cold air is conducted into the chamber through the branch 34 from the cold air trunk 32 and this cold air, after being thus heated, passes into the flue 16 and along it by opening the appropriate valves into the furnace which is being heated by the use of fuel in the burner 19.

As already stated, the burnt gases from the furnace which is thus being heated pass into the flue 25 and back through the next chamber of the series, which they preheat. Thence they pass into another section of the flue 16, which is cut off from that part which is passing the preheated air by closing one of the valves 29, and the burnt gases then pass along the flue 16 to the chimney 26.

Thus the heat imparted to the air in the cooling of the first chamber 11 is utilised when the air is burnt in the second chamber 12 and the waste heat of the gases from this chamber serve to preheat the charge in the third chamber 13. Meanwhile the receptacles 35 in the fourth chamber will be discharged, both from the condensed metal in the condenser portion 36 and from the residues in the retort portion 35 and will be recharged with fresh material.

The fifth chamber 15 constitutes a spare for use when any one of the other chambers needs repair and the four chambers which are in use at any one time are utilised cyclically in the conduct of the operations as hereinabove described. By this means heat is conserved and the output of the furnaces is maintained at a maximum.

The material which is to be fed into the retort receptacles 35 is a briquetted mixture of reducing agent and crude magnesite or dolomite. The dolomite is crushed and is mixed with the reducing agent direct in the dry state. The employment of a binding medium is not generally necessary.

During the preheating stage if dolomite or magnesite is a magnesium-bearing material of the charge, carbon dioxide is evolved, the charge being heated to about 700° C. This is withdrawn continuously from the retorts 35 and the preheating is continued until no more carbon dioxide comes away. After that the material still in the same retort is raised to a temperature of 1250° C. while the vacuum is maintained at that corresponding to an absolute pressure of 0.5 to 10 mm. of mercury. The vacuum may be maintained if desired during the calcining step as well as during reduction.

Under these conditions of reduction metallic magnesium is reduced and is distilled out of the furnace into the condenser portion 36 of the retorts where it condenses as crystals of magnesium in the metallic form.

Instead of using gas or oil-fired furnaces such as is referred to in Figure 1 it is possible to use an electric furnace. Referring to Figure 2, this shows two furnaces 40, 41 which contain retorts 35 having projecting portions 36 in which distilled magnesium can be condensed. Means are provided to maintain the retorts under vacuum as before and the furnaces are provided with resistance heaters 42. Terminals 43 for the supply of three-phase current are provided and terminals 44 for regulating the number of resistance units which are in operation at any given time. The electrical connections are shown in Figures 3 and 4. The terminals 43 are connected each to a pair of resistance units 45, 46. In the preheating stage three of the terminals 44 are connected together as shown in Figure 3 so that only the resistance units 45 are in circuit, these units being calculated to raise the temperature of the retorts to a temperature between 600° and 700° C. to the preheating step, as already described. For the subsequent reduction step all the terminals 44 are connected together as indicated in Figure 4, the resistance 46 being calculated to add the necessary heat.

In this case the preheating step is carried out in one furnace while reduction is carried out in the other. When the reducing operation at full temperature has been completed in the second furnace the current is cut off and it is permitted to cool preparatory to charging and recharging. Meanwhile the current in the first furnace is increased by bringing the second heating unit into operation so as to raise the temperature to the reaction temperature. These operations proceed alternately throughout the time the double furnace is in use.

I claim:

1. A process for the reduction of magnesium consisting in mixing material containing magnesium carbonate with a reducing metal, introducing the mixture into a vacuum chamber, raising the temperature by external heating means to calcining temperature while drawing off $CO_2$, further raising the temperature to reduction temperature after elimination of the $CO_2$ while maintaining a high vacuum and drawing off and condensing magnesium vapors, and conducting the heating gases from the reduction operation around a second vacuum chamber so as to raise the material therein to calcining temperature preliminarily to reduction of the material therein.

2. A process according to claim 1, comprising at the conclusion of said reduction passing air over the first mentioned vacuum chamber to cool the charge therein and pre-heat said air, and leading said pre-heated air to external heating means for said second vacuum chamber.

HENRI LOUIS GENTIL.